United States Patent [19]

Cook

[11] Patent Number: 4,628,398
[45] Date of Patent: Dec. 9, 1986

[54] SURGE VOLTAGE PROTECTION ARRANGEMENTS

[75] Inventor: Kenneth G. Cook, Middlesex, England

[73] Assignee: The M-O Valve Company Limited, England

[21] Appl. No.: 616,173

[22] Filed: Jun. 1, 1984

Related U.S. Application Data

[63] Continuation of Ser. No. 351,468, Feb. 23, 1982, abandoned.

[30] Foreign Application Priority Data

Mar. 2, 1981 [GB] United Kingdom ............... 8106562

[51] Int. Cl.<sup>4</sup> ......................................... H02H 9/04
[52] U.S. Cl. ...................................... 361/120; 361/56;
361/97; 361/117
[58] Field of Search ................ 361/56, 91, 111, 118,
361/120, 119, 117; 313/325, 231.1

[56] References Cited

U.S. PATENT DOCUMENTS

| | | | |
|---|---|---|---|
| 497,509 | 5/1893 | Wurts | 361/118 |
| 1,034,198 | 7/1912 | Campos | 361/118 |
| 2,089,555 | 8/1937 | Hull et al. | 361/120 X |
| 3,099,770 | 7/1963 | Sorrow et al. | 361/120 X |
| 3,538,382 | 11/1970 | Smith, Jr. | 361/56 |
| 3,611,044 | 10/1971 | Osterhout et al. | 361/128 |
| 3,889,158 | 6/1975 | Peterson | 361/56 X |
| 4,095,163 | 6/1978 | Montague | 361/111 X |
| 4,288,830 | 9/1981 | Brasfield | 361/56 |

FOREIGN PATENT DOCUMENTS

| | | |
|---|---|---|
| 897586 | 10/1953 | Fed. Rep. of Germany . |
| 927103 | 3/1955 | Fed. Rep. of Germany ...... 361/118 |
| 2100931 | 7/1971 | Fed. Rep. of Germany . |
| 2423646 | 6/1978 | Fed. Rep. of Germany . |

Primary Examiner—A. D. Pellinen
Assistant Examiner—Derek S. Jennings
Attorney, Agent, or Firm—Kirschstein, Kischstein, Ottinger & Israel

[57] ABSTRACT

A surge voltage protection arrangement for a load 10 connected to an A.C. supply 8 comprising a gas-filled excess voltage arrester 11 connected in series with a capacitor 12 across the load 10. The value of the capacitor 12 is chosen such that the largest expected surge pulse which causes the arrester 11 to fire will not charge the capacitor to such an extent that the voltage then applied across the load 10 exceeds that of the A.C. supply 8. The arrangement enables the arrester 11 to recover after such a surge pulse within a fraction of an A.C. supply cycle, thus avoiding placing an unnecessary load on the arrester. A resistor 13 whose resistance is of a value such that the capacitor 12 is able to discharge through it within one half cycle of the A.C. supply may be connected across the capacitor 12.

8 Claims, 3 Drawing Figures

SURGE VOLTAGE PROTECTION ARRANGEMENTS

This is a continuation of application Ser. No. 351,468 filed Feb. 23, 1982, now abandoned.

This invention relates to surge voltage protection arrangements.

The invention relates particularly to surge voltage protection arrangements utilising a gas-filled excess voltage arrester for protecting a load against surge voltages on an A.C. supply to which the load is connected.

By a gas-filled excess voltage arrester is meant an arrester comprising a gas-filled enclosure having a pair of electrodes which define between them a discharge gap.

Figure 1:
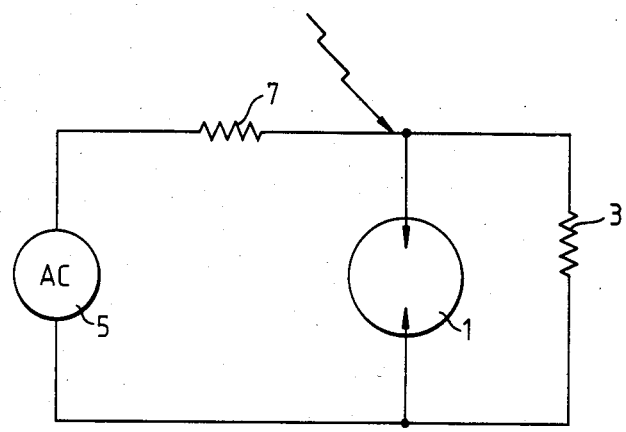
FIG. 1 shows a conventional A.C. supply surge voltage protection arrangement using a gas-filled excess voltage arrester

Referring to FIG. 1, the arrangement comprises a gas-filled excess voltage arrester 1 connected in parallel with a load 3 supplied from an A.C. supply source 5 having an impedance represented by a resistor 7.

In operation, when a surge voltage appears across the load 3 exceeding the arrester breakdown voltage the discharge gap in the arrester breaks down short circuiting the overvoltage.

Figure 2:
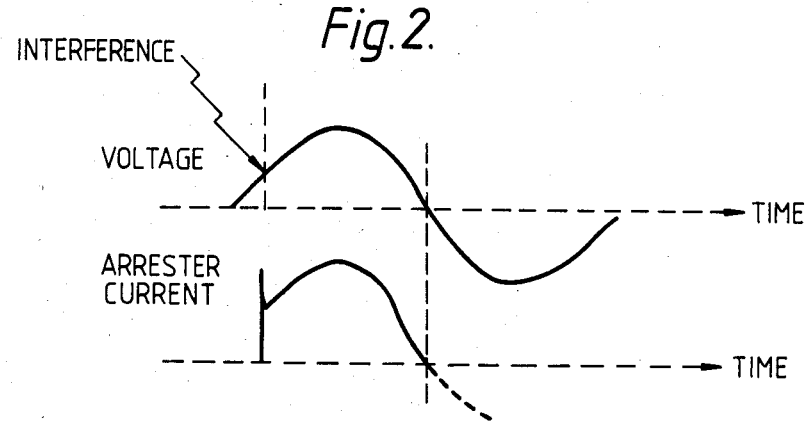
FIG. 2 illustrates the operation of such an arrangement.

Referring now to FIG. 2, with this arrangement after the surge voltage has ceased, the arrester will continue to conduct for the remainder of the half cycle in which the surge occurs until the voltage across the arrester falls below the relatively low voltage required to maintain an arc discharge in the arrester. However, the coulomb discharge after the surge has ceased may be much larger than the discharge during the surge, and this may place an unnecessary load on the arrester which can lead to damage to the electrodes of the arrester coupled with changes in the arrester's electrical performance. Additionally the arrester may sometimes fail to recover at the voltage minimum of the A.C. cycle and will thus draw current continuously from the A.C. supply, permanently short circuiting it, or operating the supply overload protection arrangement.

It is an object of the present invention to provide a surge voltage protection arrangement which alleviates these problems.

According to the present invention a surge voltage protection arrangement for a load connected to an A.C. supply comprises a gas-filled excess voltage arrester connected in series with a capacitance across the load. Preferably a resistance, whose value is such that the capacitance is able to discharge through it within one half cycle of the A.C. supply is connected across the capacitance. It is known to connect a capacitor in series with an arrester in a protection arrangement for a load connected to a D.C. supply, such a capacitor (or alternative equivalent means) being required in order that the arrester may recover after the cessation of an excess voltage pulse which has caused the arrester to fire. However, it has not hitherto been proposed to incorporate a capacitance in a protection arrangement for a load connected to an A.C. supply since, due to the supply voltage being alternating the presence of a capacitance is not normally necessary to allow the arrester to recover.

Thus the invention resides in the realization that contrary to what might be expected the use of a series capacitor in a gas-filled arrester surge protection arrangement for a load connected across an A.C. supply is advantageous. As explained below a further feature of the invention is that the capacitance, when provided with a parallel resistance, can be much larger than might be expected, thus providing a high measure of surge protection without impairing operation of the arrangement.

One surge voltage protection arrangement in accordance with the invention will now be described by way of example only, with reference to the accompanying drawing, FIG. 3, which is a circuit diagram of the surge voltage protection arrangement.

Figure 3:
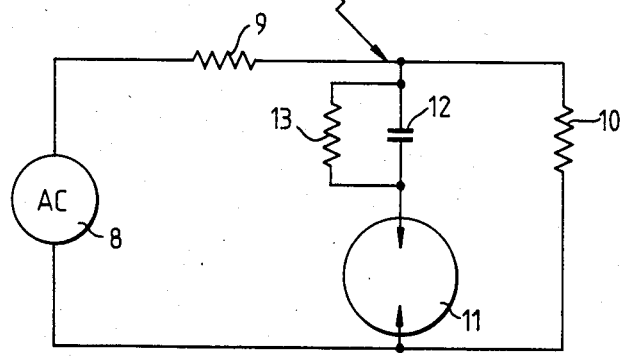
FIG. 3 shows an A.C. supply surge voltage protection in accordance with the invention.

Referring to FIG. 3, the arrangement comprises an A.C. supply 8 having a source impedance represented by resistor 9 and a load 10 connected across the supply. A gas-filled surge voltage arrester 11 is connected in series with a capacitor 12 across the load 10. A resistor 13 is connected in parallel with the capacitor 12.

On occurrence of a surge voltage on the supply the arrester 11 breaks down causing the capacitor 12 to start to charge up. The value of the capacitor 12 is chosen such that the largest expected surge pulse will not charge the capacitor to such an extent that the voltage across the capacitor and arrester, and consequently that applied to the load 10, exceeds the normal mains supply.

After the surge has ceased the capacitor 12 continues to charge via the arrester 11 towards a peak voltage equal to the instantaneous voltage of the supply, the charging rate being slower than during the surge, but never-the-less sufficiently rapid for the capacitor charge voltage to reach the instantaneous supply voltage in a small fraction of an A.C. supply cycle. However, before or, as explained below, at the latest shortly after this voltage is reached the current through the arrester 11 will have fallen below the value sufficient to maintain the discharge in the arrester in the arc mode. The discharge will then change to the glow mode and the arrester extinguish since there will be insufficient voltage available to maintain a glow mode discharge in the arrester.

Hence the coulomb value of the current flowing through the arrester is prevented from being large enough to damage the arrester, and except in the case of surges occuring very late in a half cycle, the coulomb value of the current through the arrester is very substantially less than if the arrester remained conducting for the remainder of the half cycle in which the surge occurs.

The resistor 13 serves to allow the capacitor to discharge to allow the arrester to fire again, if need be, in the next half cycle.

The arrangement is found to operate satisfactorily even when the capacitor is made of large value, e.g. 10 or more microfarads, as is required to obtain satisfactory protection against surge pulses of relatively large coulomb value. It will be appreciated that with a relatively large value capacitor the resistor 9 must be of relatively low value, e.g. 500 ohms or less, to ensure rapid discharge of the capacitor. In this connection it might at first be thought that the presence of a low value resistor in parallel with the capacitor will provide the arrester with sufficient current to remain conducting almost until a supply voltage zero is reached. However, in fact, the current through the arrester will necessarily fall below the value sufficient to maintain the discharge in the arrester as soon as the instantaneous supply voltage starts to decrease. This is because the decreasing supply voltage rapidly results in discharge of the capacitor through the resistor, the resulting current cancelling the arrester current flow in the resistor.

In one particular arrangement for use with a 50 Hz, 240 volt, 13 amp A.C. supply, the arrester 11 is chosen to have a breakdown voltage of 500 volts and to operate in the arc mode and glow discharge modes at voltages of 25 volts and 200 volts respectively.

Suitable values for the capacitor 12 and resistor 13 are 50 microfarads and 100 ohms respectively.

With such an arrangement, a surge voltage pulse of 1 kilovolt will typically produce a current of 500 amps for 10 microseconds through the arrester 11. This will charge the capacitor 12 to 100 volts, the arrester 11 operating in the low voltage arc mode, with a voltage across the arrester of about 25 volts. The voltage thus applied across the load 10 will at 125 volts, be appreciably less than the normal mains supply.

Immediately the overvoltage has ceased the follow through current from the mains supply will typically be 100 Amps. This will, within a small faction of an A.C. cycle, i.e. in a period not more than 0.7 milliseconds, charge the capacitor 12 to the value of the instantaneous voltage of the A.C. supply and cause the arrester to extinguish.

The resistor 13 will discharge the capacitor in approximately one half cycle of the supply to allow the arrester to fire again in the next half cycle, if necessary.

It will be appreciated that suitable choice of components will permit a surge voltage protection arrangement in accordance with the invention to be used where higher currents arise.

Operation at higher voltages is suitably obtained by using a series arrangement of two or more excess voltage arresters.

It will be appreciated that a number of arrangements in accordance with the invention may be used to provide protection in a polyphase A.C. supply system.

I claim:

1. A circuit arrangement comprising: a load, which is connected across a periodic A.C. supply, and a surge voltage protection arrangement for the load, said surge voltage protection arrangement comprising a gas-filled excess voltage arrester, a capacitance connected in series across the load and a resistance connected in parallel with the capacitance; the arrester constituting the sole voltage arrester of the surge voltage arrangement and starting to conduct at a voltage greater than that at which it will extinguish; and the capacitance having a value such that, with the arrester conducting and the A.C. supply voltage applied across the load, the capacitance charges substantially to the instantaneous value of the supply voltage, thereby extinguishing the arrester in a fraction of the A.C. supply period.

2. A circuit arrangement according to claim 1, wherein the values of the capacitance and resistance are such that the capacitance is able to discharge through the resistance within one half cycle of the A.C. supply.

3. A circuit arrangement according to claim 2, wherein the capacitance has a value of not less than 10 microfarads.

4. A circuit arrangement according to claim 1, wherein the resistance has a value of not more than 500 ohms.

5. A circuit arrangement according to claim 4, wherein the capacitance has a value of not less than 10 microfarads.

6. A circuit arrangement according to claim 1, wherein the capacitance has a value of not less than 10 microfarads.

7. In an A.C. circuit wherein an A.C. supply is connected across a load for supplying a periodic A.C. supply voltage thereto, a surge voltage protection arrangement for protecting the load from a surge voltage, said arrangement comprising:
(a) a single gas-filled excess voltage arrester having spaced-apart electrodes and fireable from an extinguished state, in the event of a surge voltage, to a conducting state in which a surge current is conducted between the electrodes, the voltage at which said arrester fires being greater than that at which the arrester recovers from its conducting state to its extinguished state; and
(b) means for causing the arrester to rapidly recover from the conducting state to the extinguished state in a fraction of a period of the A.C. supply voltage, said means constituting a capacitor connected in series with the arrester, said capacitor and said arrester together being connected in parallel across the load, and a resistor connected in parallel with the capacitor, said capacitor charging substantially to the instantaneous value of the A.C. supply voltage when the arrester is in the conducting state, and said capacitor having a predetermined capacitance value such that, after the cessation of the surge voltage,
 (i) the arrester rapidly recovers from the conducting state to the extinguished state within said fraction of said period, and
 (ii) the surge current ceases within said fraction of said period before the surge current damages the electrodes of the arrester, thereby increasing the reliability of the arrester in the A.C. circuit,
and said resistor having a predetermined resistance value such that after the cessation of the surge voltage, the capacitor discharges through the resistor within one half cycle of said period of the A.C. supply voltage.

8. The protection arrangement according to claim 7, wherein the resistance value is not more than 100 ohms, and the capacitance value is not less than 10 microfarads.

* * * * *